(12) United States Patent
Devane

(10) Patent No.: US 11,100,225 B2
(45) Date of Patent: Aug. 24, 2021

(54) SCANNING OF ENCRYPTED ZIP FILES

(71) Applicant: McAfee, LLC, Santa Clara, CA (US)

(72) Inventor: Oliver G. Devane, Upton (GB)

(73) Assignee: McAfee, LLC, Santa Clara, CA (US)

( * ) Notice: Subject to any disclaimer, the term of this patent is extended or adjusted under 35 U.S.C. 154(b) by 326 days.

(21) Appl. No.: 16/235,525

(22) Filed: Dec. 28, 2018

(65) Prior Publication Data

US 2020/0210572 A1 Jul. 2, 2020

(51) Int. Cl.
*G06F 21/56* (2013.01)
*G06F 21/60* (2013.01)
*G06F 16/903* (2019.01)
*H03M 7/30* (2006.01)

(52) U.S. Cl.
CPC ...... *G06F 21/564* (2013.01); *G06F 16/90344* (2019.01); *G06F 21/566* (2013.01); *G06F 21/602* (2013.01); *H03M 7/30* (2013.01); *G06F 2221/033* (2013.01); *G06F 2221/2107* (2013.01)

(58) Field of Classification Search
CPC ............. G06F 21/564; G06F 16/90344; G06F 21/566; G06F 21/602; H03M 7/30
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 9,888,016 B1* | 2/2018 | Amin | H04L 63/1483 |
| 2010/0095380 A1* | 4/2010 | Fossen | G06F 21/561 726/24 |
| 2013/0104251 A1* | 4/2013 | Moore | G06F 21/602 726/30 |
| 2016/0292415 A1* | 10/2016 | Adams | H04L 63/1441 |
| 2017/0177877 A1* | 6/2017 | Suarez | G06F 16/188 |
| 2019/0108340 A1* | 4/2019 | Bedhapudi | G06F 16/1734 |
| 2019/0108341 A1* | 4/2019 | Bedhapudi | G06F 16/1752 |
| 2019/0109870 A1* | 4/2019 | Bedhapudi | H04L 63/0428 |

* cited by examiner

*Primary Examiner* — Oleg Korsak
(74) *Attorney, Agent, or Firm* — Patent Capital Group

(57) ABSTRACT

There is disclosed in one example a computing apparatus, including: a hardware platform including a processor and a memory; and one or more mediums including instructions to instruct the processor to provide a security scanner to: determine that an object to be inspected is an archive including a plurality of bundled files; determine that the archive is encrypted; identify unencrypted data within the encrypted archive that can be made visible to an end user after a failed decryption operation; scan the unencrypted data for a pattern that matches password data; and attempt to decrypt the archive according to the password data.

18 Claims, 9 Drawing Sheets

SCANNING OF ENCRYPTED ZIP FILES

FIELD OF THE SPECIFICATION

This disclosure relates in general to the field of anti-malware technology, and more particularly, though not exclusively, to a system and method for scanning of encrypted ZIP files.

BACKGROUND

Modern computers often have always-on Internet connections. Such connections can provide multiple vectors for security threats to attack a system.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
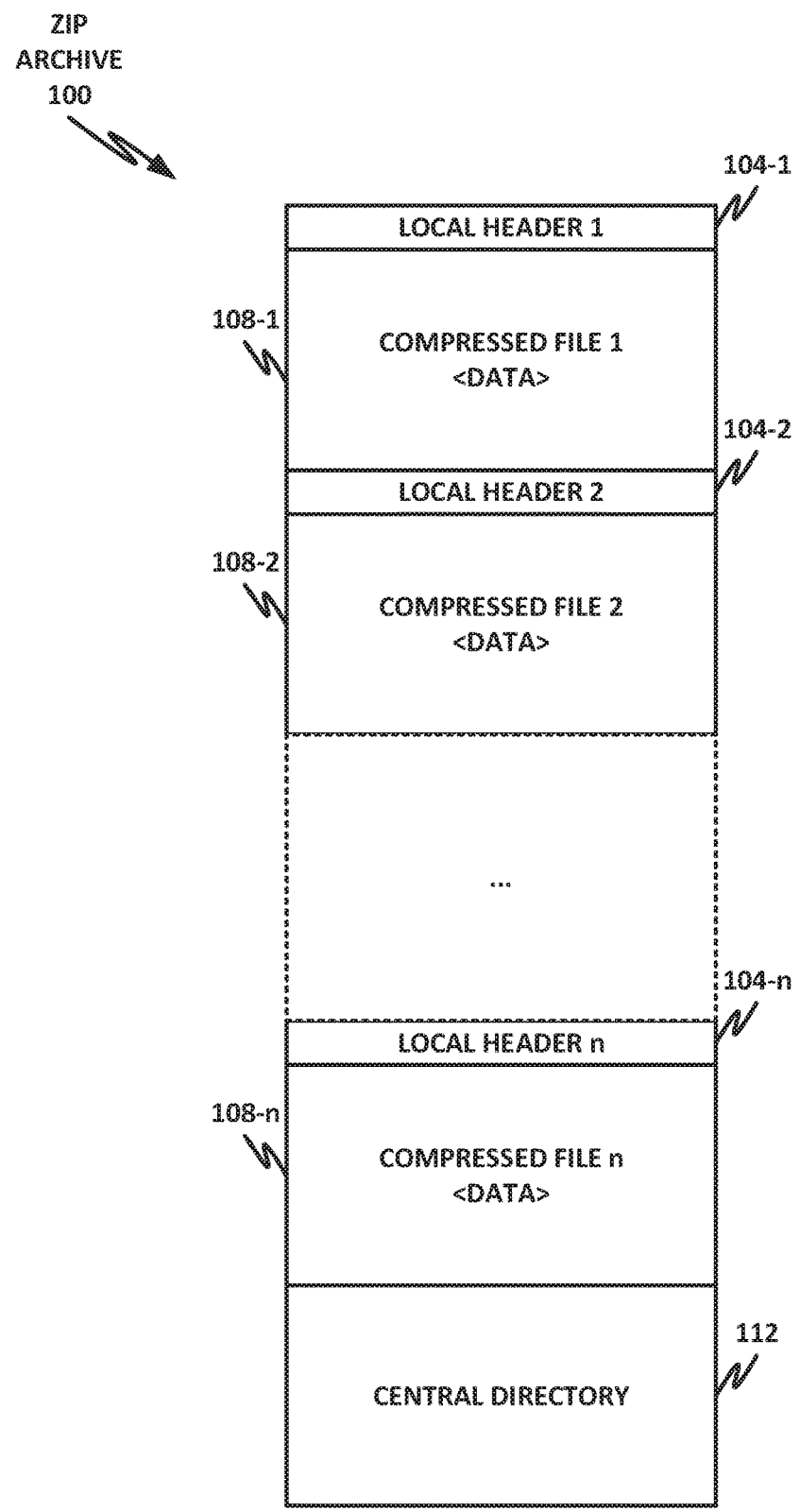
FIG. 1 is a block diagram of a ZIP archive.

In an example, there is disclosed a computing apparatus, comprising: a hardware platform comprising a processor and a memory; and one or more mediums including instructions to instruct the processor to provide a security scanner to: determine that an object to be inspected is an archive comprising a plurality of bundled files; determine that the archive is encrypted; identify unencrypted data within the encrypted archive that can be made visible to an end user after a failed decryption operation; scan the unencrypted data for a pattern that matches password data; and attempt to decrypt the archive according to the password data.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Anti-malware software from vendors such as MCAFEE, LLC has become increasingly sophisticated in its ability to detect and mitigate malware carried in files. This has led to something of an arms race between the anti-malware vendors, who have developed increasingly more sophisticated tools for detecting malware, and malware authors who continue to develop increasingly sophisticated malware packages.

Because anti-malware vendors are very good at identifying malware within files, malware authors have adopted techniques to obfuscate the identity of files, themselves. For example, one relatively recent technique is the use of so-called "fileless malware attacks," or "living off the land attacks," that do not use a traditional file system file. However, such fileless attacks are relatively complicated, and much more difficult to carry out than traditional file-based attacks.

Another technique that has been used to obfuscate a malware file is to place the malware file or object within an encrypted, compressed file format, such as a ZIP file. The ZIP file format is used throughout this specification as an example of a popular format, both for file compression and for carrying out the types of attacks described herein. It should be noted, however, that other file archiving compression formats may be used, including Archiver (.a), cpio (.cpio), Shell Archive (.shar, .run), tape archive (.tar), extended tar, Bagit, 7zip (.7z), ACE (.ace), AFA (.afa), ARC (.arc), ARJ (.arj), B1 (.b1), cabinet (.cab), compact file set (.cfs), compact pro (.cpt), disk archive (.dar), DGCA (.dgc), FreeArc (.arc), LHZ (.lzh, .lha), LZX (.lzx), Sparc (.arc), WinMount (.mou), Macintosh disk image (.dmg), partition image (.partimg), PAQ family (.paq*, .lpaq*), PEA (.pea), PIM (.pim), Quadruple D (.qda), RAR (.rar), RK (.rk), NuFX (.shk), Stuffit (.sit), Stuffit X (.sitx), UltraCompressor II (.uc, .uc0, .uc2, .ucn, .ur2, .ue2), Windows Image (.wim), Zip/PKZIP (.zip), and ZPAQ (.zpaq), or any other suitable file bundling, archiving, or compression technology.

Taking the ZIP file format as an example, a ZIP file includes a plurality of n file entries, with each file entry starting at a relative offset and having a local header that provides metadata about the file, followed by the actual file data. This string of compressed files with local headers is concatenated together, and a central directory having an entry for each file is appended to the end of the ZIP file.

Versions of the standardized ZIP file format provide a simple password-based symmetric encryption algorithm that can be used to encrypt the contents of a ZIP file. While there are some known vulnerabilities with this encryption format, it is well-suited to the purpose of malware authors. The ZIP encryption technology is vulnerable to some known plaintext attacks and to brute force attacks, but it is not reasonable to assume that an anti-malware scanner will carry out such attacks on an encrypted file.

One useful aspect of the native ZIP encryption feature is that the content of the local headers may not be encrypted. For example, if a ZIP archive includes two files, namely a 1 kB file called "readme.txt," and a 10 MB file named "Trojan.exe," even if the ZIP archive is encrypted, so that the content of those two files is obfuscated, the local headers prepended onto the content of the two files remains unencrypted. As of version 6.2 of the ZIP specification, the central directory may be encrypted, but the local headers remain unencrypted. Note that some ZIP program authors work around this apparent vulnerability by providing false local headers.

However, this apparent vulnerability is actually very useful to some malware authors. Taking the previous example of a ZIP archive including a text file and an executable, if the executable is a malware attack, then the name of the text file can be used as a mechanism to defeat an anti-malware scanner. In this type of attack, the password-protected ZIP archive is intended to pass through a gateway or endpoint including an anti-malware scanner. The anti-malware scanner may be configured to identify archives such as ZIP files, and to piecewise extract the contents of the archive to scan the individual files to identify malware. However, if the ZIP archive is encrypted, the anti-malware scanner is not able to perform the piecewise extraction. Thus, the anti-malware scanner may be unable to identify a known malware file within the ZIP archive. However, a clever malware author may include a text file in the archive, with a filename such as "password equals ABCDEF.txt."

Thus, the ZIP file may pass through the malware scanner without the malware file being identified. This would not be useful to the malware author if the end user is not thereafter able to decrypt the ZIP file. However, when the user attempts to decrypt the ZIP file, he will be asked for a password and will not be able to provide it. Thereafter, many existing UNZIP utilities will create on the disk a series of 0-byte file descriptors representing the names of the file in the archive. Thus, after the user fails to provide the correct password to decrypt the file, the UNZIP utility may create on the disk a 0-byte file named "password equals ABCDEF.txt." The end user has now been provided with sufficient information to decrypt the ZIP file. The user may again attempt the UNZIP operation, and this time knows the correct password to provide the UNZIP utility. The malicious file is then uncompressed, and the user is able to run the executable file with the malicious payload. Note that the executable file with the malicious payload may masquerade as a useful file, such as by providing a simple game or utility that the user may find desirable, and having the malicious part of the file as a writer onto the apparently useful part of the file.

If left unmitigated, this kind of attack can represent a successful workaround for malware authors attempting to defeat the anti-malware mechanism.

Embodiments of the present specification include a software utility that may run on an endpoint, in a gateway, in an enterprise anti-malware scanner, on an anti-malware appliance, or on any other suitable computing device with the ability to identify malicious files hidden within compressed archives. Once identified, these files may be remediated or otherwise mitigated, for example, by way of quarantine and/or notification of an end user.

According to the teachings of the present specification, the malware detection engine may identify a ZIP archive as the payload of a file, and identify that the ZIP archive is encrypted. Once the anti-malware scanner has identified the archive as an encrypted archive, it may iterate through the filenames of files within the encrypted or password-protected ZIP archive. As described above, these filenames appear as plain text rather than being encrypted. The anti-malware scanner may use regular expressions to determine whether any of the files represent a filename matching a pattern that makes it likely to contain a password for the encrypted archive. Advantageously, the malware author will want to use minimal obfuscation in providing the password for decrypting the ZIP file, so that the end user can easily identify the password among the list of files. Furthermore, if malware authors become more sophisticated in their use of filenames, the anti-malware scanner can evolve to keep up with changes in how passwords are provided in filenames and encrypted ZIP files.

If the anti-malware scanner identifies a file whose filename appears to be a password, the password is extracted from the filename, and is then used to attempt to extract the ZIP file contents using the supplied password. If the extraction is successful, the ZIP file and its contents may be scanned by the anti-malware scanner. In some embodiments, heuristic detection may be possible if a password is provided that is believed to be used solely or primarily by malicious actors.

If password extraction fails, then no scanning or detection occurs on the compressed ZIP file. In this case, the encrypted archive may be flagged as suspicious, particularly in the case of an enterprise. At a minimum, a user may be warned that the encrypted, compressed archive could not be successfully scanned by the anti-malware scanner, and therefore may be potentially dangerous.

Use of this anti-malware scanning technique can make the antivirus detector more efficacious in identifying a relatively new species of malware that is gaining popularity among malware authors. Advantageously, this technique is more graceful than using other techniques such as brute force or plain-text attacks that may be able to succeed, but that are very resource intensive. Use of such techniques may be prohibitive in a case where an anti-malware scanner is required to scan many files in the operation of an enterprise or personal network.

A prototype anti-malware scanner designed according to the teachings of the present specification was able to successfully identify passwords extracted from several hundreds of malicious files. These passwords were able to successfully be used to decrypt the ZIP archives, extract the contents, and enable the anti-malware scanner to scan and identify the malicious files.

A system and method for scanning of encrypted ZIP files will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a ZIP archive 100. ZIP archive 100 may conform to embodiments of the ZIP file format, including versions up through version 6.2 of this specification. ZIP archive 100 may also conform to later versions of the ZIP specification.

ZIP archive 100 includes a plurality of files that have been compressed. These are identified as compressed file 1 108-1, compressed file 2 108-2, up through compressed file n **108-*n*. Each compressed file includes data representing a lossless compression of the source file, and has prepended thereto a local header. Specifically, local header 1 104-1 is prepended to compressed file 1 108-1. Local header 2 104-2 is prepended to compressed file 2 108-2. Local header 104-*n* is prepended to compressed file n 108-*n*. A central directory 112** also includes metadata for each of the compressed files included in the ZIP archive.

In accordance with the ZIP archive specification, the local header may be a little-endian byte order comprising metadata about the compressed file.

In the current version of the ZIP specification, the metadata include the following:

| Local File Header | | |
|---|---|---|
| Offset | Bytes | Description |
| 0 | 4 | Local file header signature = 0x04034b50 (read as a little-endian number) |
| 4 | 2 | Version needed to extract (minimum) |
| 6 | 2 | General purpose bit flag |
| 8 | 2 | Compression method |
| 10 | 2 | File last modification time |
| 12 | 2 | File last modification date |
| 14 | 4 | CRC-32 |
| 18 | 4 | Compressed size |
| 22 | 4 | Uncompressed size |
| 26 | 2 | File name length (n) |
| 28 | 2 | Extra field length (m) |
| 30 | n | File name |
| 30 + n | m | Extra field |

Figure 2:
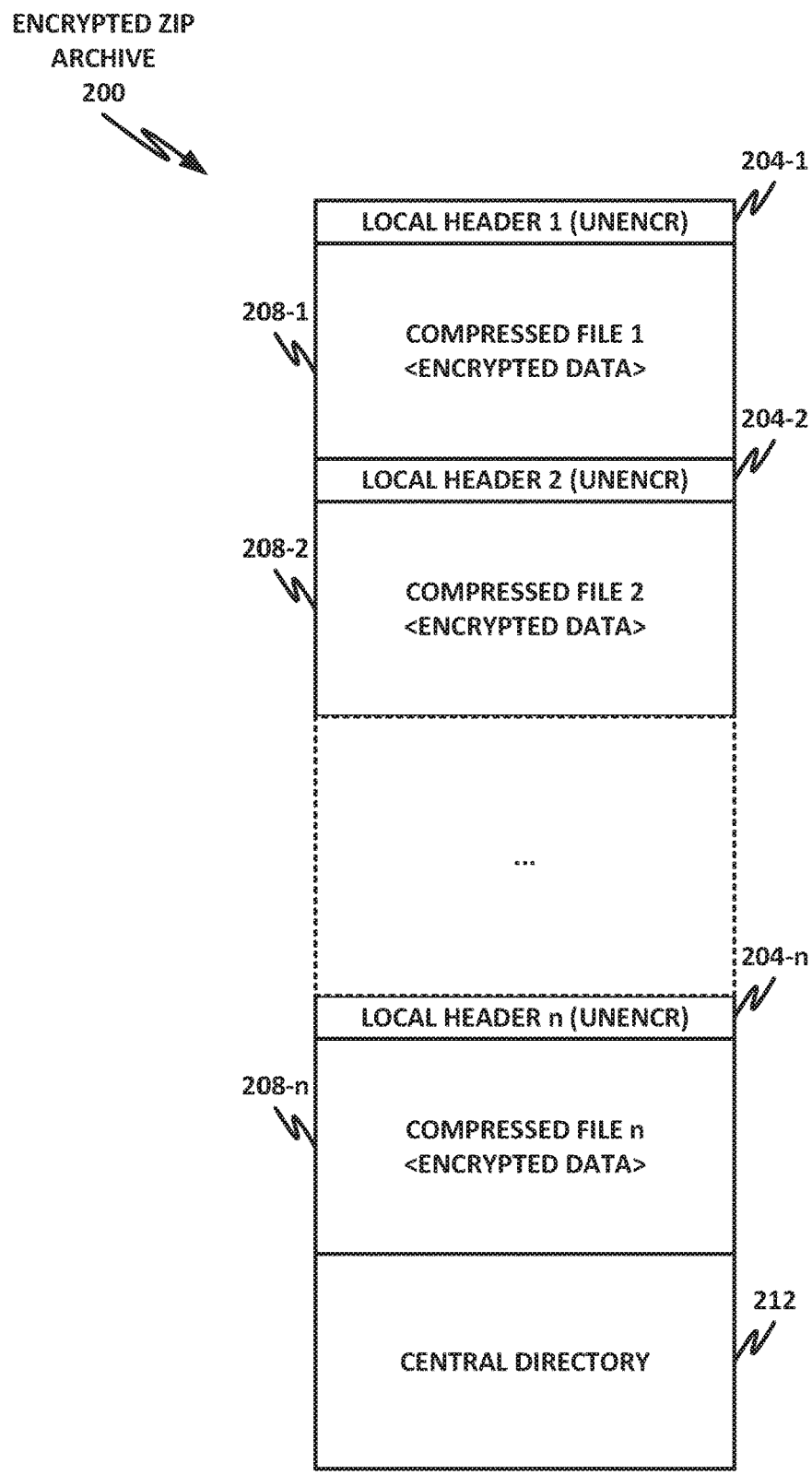
FIG. 2 is a block diagram of an encrypted ZIP archive.

FIG. 2 is a block diagram of an encrypted ZIP archive 200. ZIP archive 200 includes compressed file 1 208-1, compressed file 2 208-2, through compressed file n 208-$n$. Data for each of these files is not only compressed according to a ZIP archive format, but may also be encrypted according to a standardized ZIP encryption mechanism. Prepended to the encrypted data for each compressed file is a local header. Specifically, local header 1 204-1 is prepended to compressed file 1 208-1. Local header 2 204-2 is prepended to compressed file 2 208-2. Local header n 204-$n$ is prepended to compressed file n 208-$n$.

As before, a central directory 212 is provided with metadata about all of the files in the ZIP archive. In some later versions of the ZIP specification, central directory 212 may be encrypted. However, local headers 204 remain unencrypted. The unencrypted nature of local headers 204 gives rise to the style of attack that is the subject of the present specification.

Figure 3:
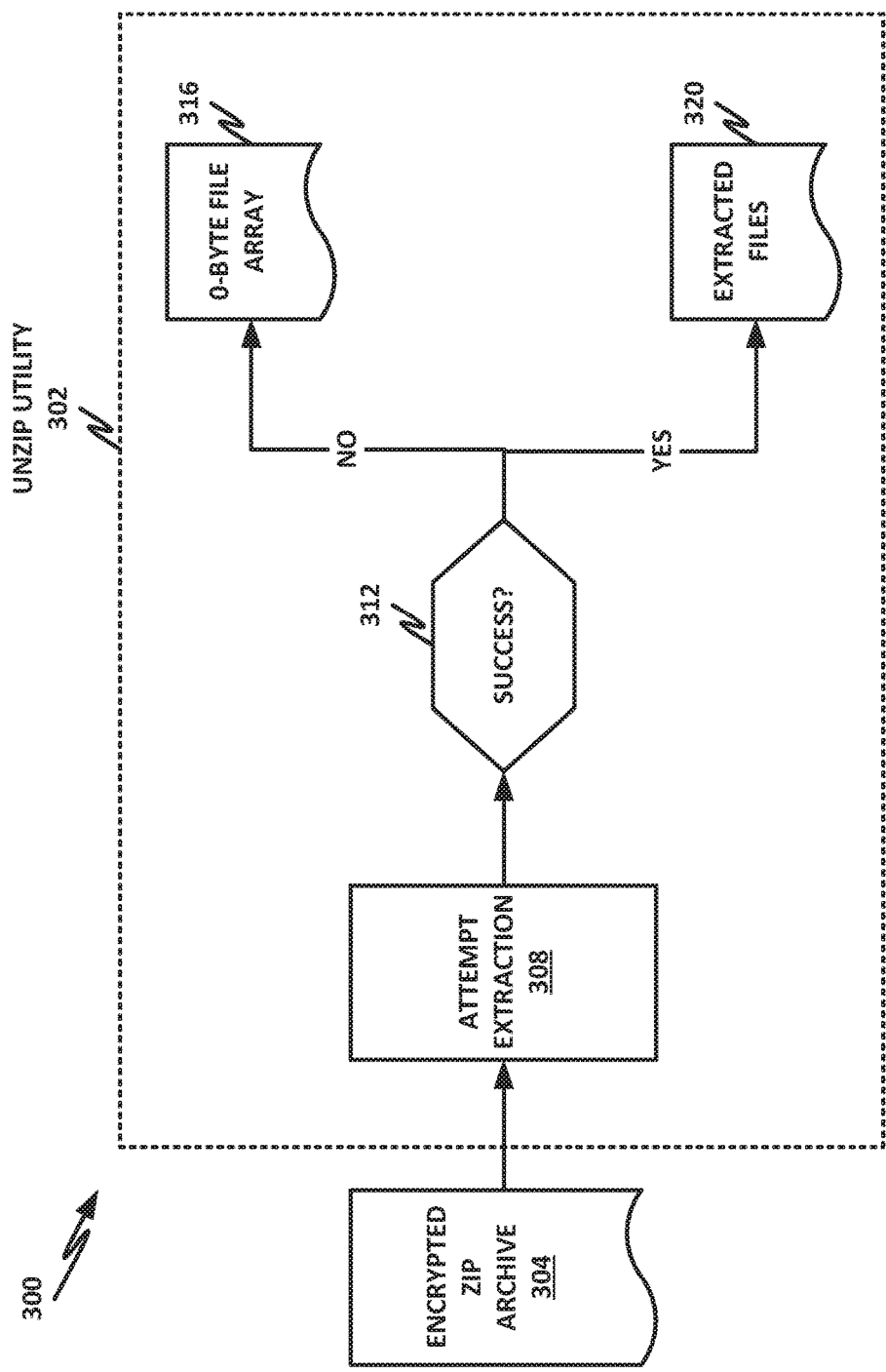
FIG. 3 illustrates an example flow that may be followed by an UNZIP utility.

FIG. 3 illustrates an example flow 300 that may be followed by an UNZIP utility. In this case, UNZIP utility 302 receives an encrypted ZIP archive 304. At block 308, UNZIP utility 302 attempts to extract encrypted ZIP archive 304. Extracting the encrypted archive may include querying a user for a password for the encrypted archive, querying a key ring or other operating system utility for the password, or querying a credential file or other location for the password used for symmetric encryption of encrypted ZIP archive 304.

In decision block 312, UNZIP utility 302 may determine whether the attempted extraction of the archive was successful. If extraction is successful, then UNZIP utility 302 provides extracted files 320. If extraction is unsuccessful, then UNZIP utility 302 may provide an array 316 of 0-byte files that contain just the unencrypted filenames extracted from the local headers for the individual compressed files, as illustrated in local headers 204 of FIG. 2. As described above, this 0-byte file array 316 may be a useful place for a malware author to include a filename that provides the user with the correct password, or a hint for the correct password, so the user can extract the encrypted ZIP archive 304.

Figure 4:
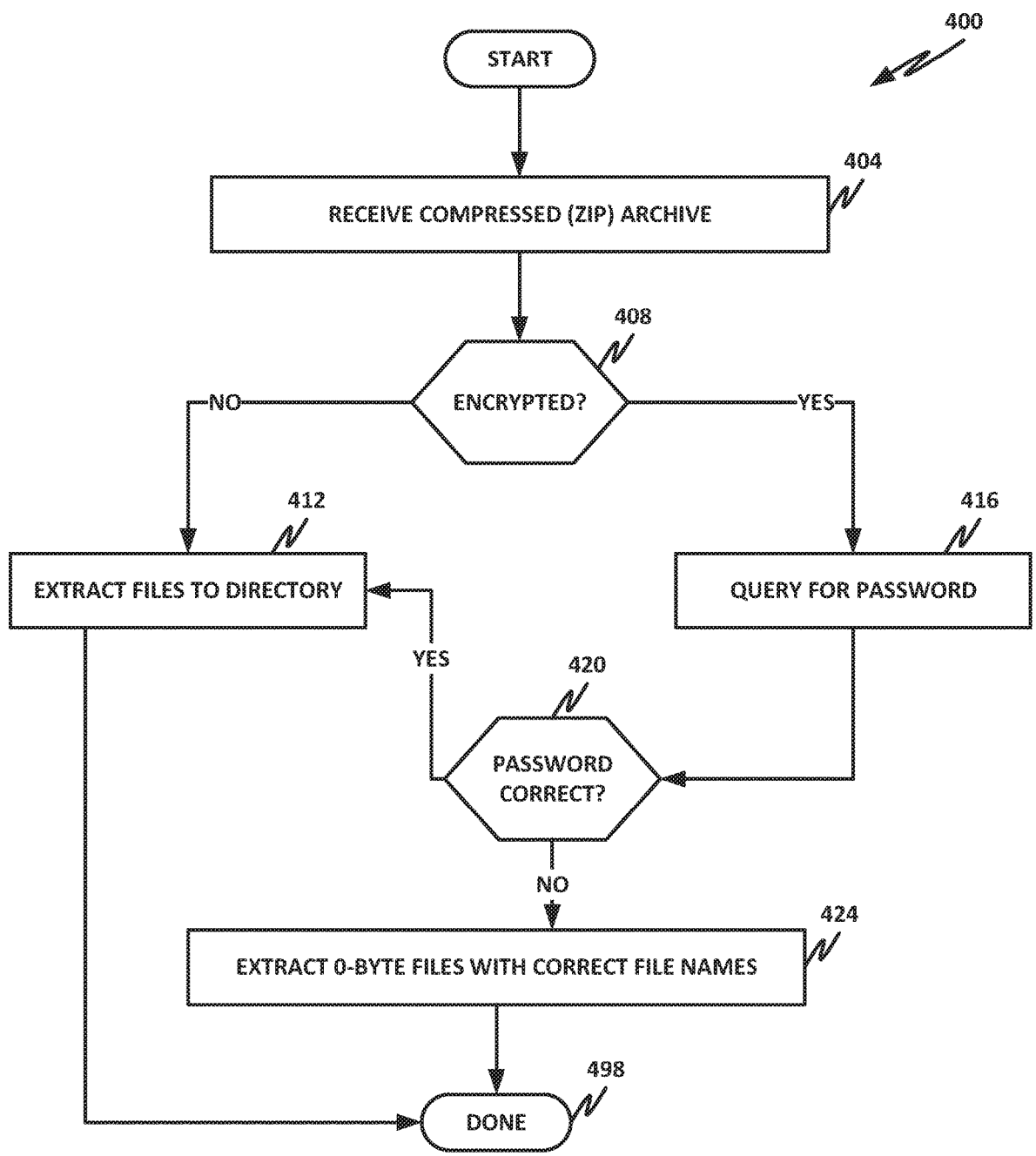
FIG. 4 is a flowchart of a method of performing extraction of a compressed ZIP archive.

FIG. 4 is a flowchart of a method 400 of performing extraction of a compressed ZIP archive.

In block 404, the UNZIP utility receives the compressed ZIP or other format archive.

In decision block 408, the UNZIP utility determines whether the compressed archive is encrypted. If the archive is not encrypted, then in block 412, the UNZIP utility extracts the files to the appropriate directory, and in block 498, the method is done.

Returning to decision block 408, if the ZIP archive is determined to be encrypted, then in block 416, the UNZIP utility may query for the correct password. As described above, this can include querying a user with a dialog box, checking a key ring or credential file, or retrieving the password from a third-party password service.

In block 420, the UNZIP utility may check the password, for example, by hashing the password and checking against a password hash, or otherwise determining whether the password is the correct password for the archived file. In decision block 420, if the password is correct, then in block 412, the UNZIP utility extracts the files in the ZIP archive to the appropriate directory. If the password is not correct, then in block 424, the UNZIP utility may extract an array of 0-byte files with correct filenames for the files contained in the ZIP archive. This is possible, as explained above and as illustrated in FIG. 2, because the local headers of the ZIP files are not encrypted.

In block 498, the method is done.

Figure 5:
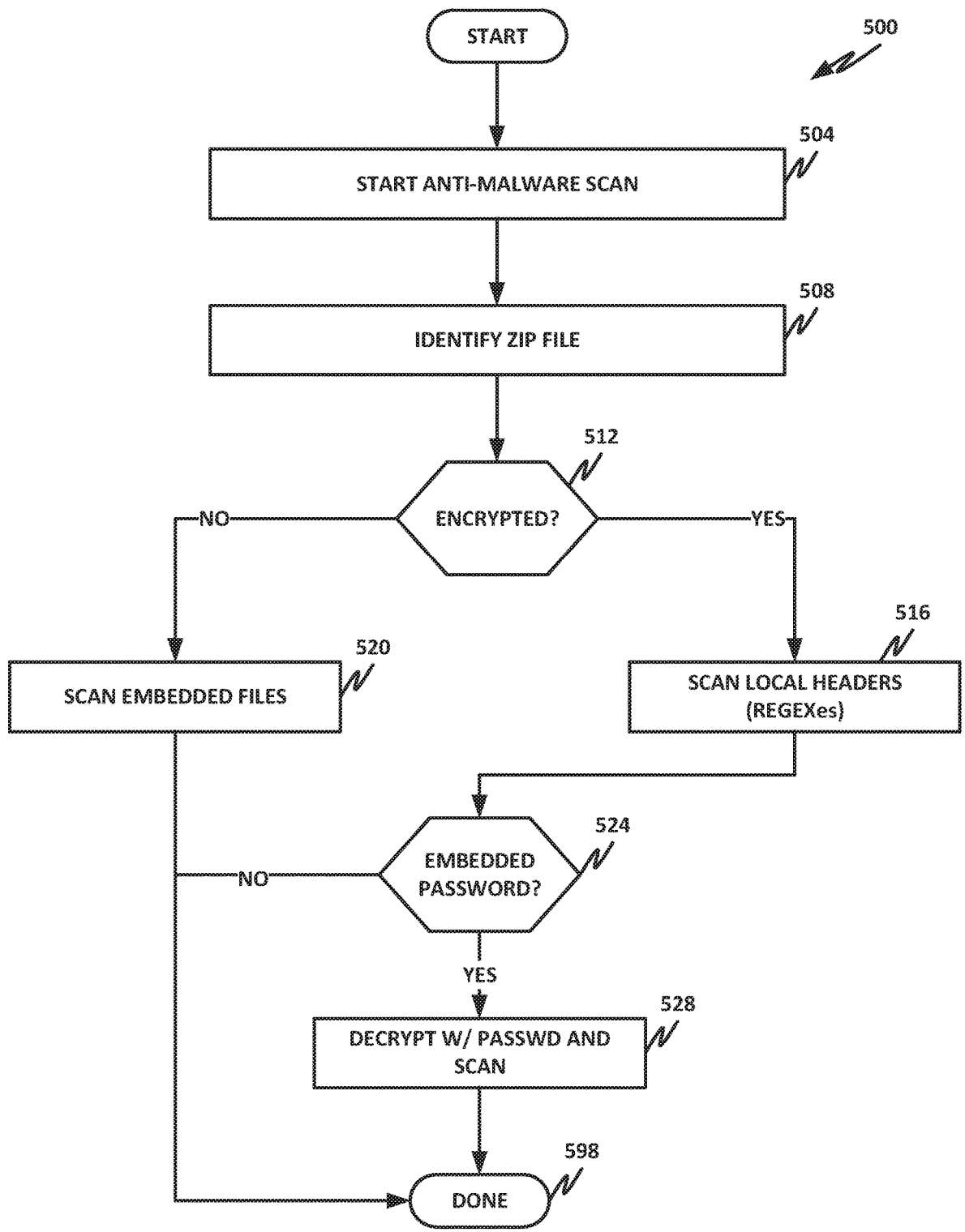
FIG. 5 is a flowchart of a method of identifying potential malware within an encrypted file.

FIG. 5 is a flowchart of a method 500 of identifying potential malware within an encrypted file. Method 500 may be performed by an anti-malware scanner located on a client, a local device, a mobile device, a gateway, a router, a firewall, a security appliance, or any other suitable computing device configured for anti-malware scanning.

In block 504, the anti-malware scanner begins its anti-malware scan.

In block 508, in the course of the anti-malware scan, the anti-malware scanner identifies a ZIP file. Because malware objects can be hidden within ZIP files, it may be desirable for the anti-malware scanner to piecewise decompress the files within the ZIP archive, and to check them for malware.

In decision block 512, the anti-malware scanner checks to see whether the ZIP file under analysis is encrypted.

If the ZIP file is not encrypted, then in block 520, the anti-malware scanner can simply scan the embedded files within the compressed archive, and determine whether any of them are malware. If any of the files are malware, then appropriate remedial action may be taken, such as quarantining the file and/or notifying a user or security administrator of the infected file. In block 598, the method is done.

Returning decision to block 512, if the anti-malware scanner determines that the ZIP archive or other compressed archive is encrypted, then it cannot simply extract and scan the embedded files. Rather, in block 516, the anti-malware scanner may scan the local headers or other uncompressed data to identify filenames or other information that may be made visible to end users, and that may contain a password or password hint. The anti-malware scanner may use regular expressions, literal matching, heuristic engines, or other techniques to identify potential passwords or password hints within the compressed, encrypted archive.

At decision block 524, the anti-malware scanner determines whether any of the filenames or other metadata are likely to include embedded passwords. If no embedded passwords are found, then in block 598, the method is done. In this case, the compressed ZIP archive cannot be scanned, and as appropriate, other remedial action may be taken. By way of nonlimiting example, remedial actions may include warning or notifying an end user or security administrator, or flagging the file as suspicious.

Returning to decision block 524, if an embedded password or password hint is identified, then in block 528, the identified password is used in an attempt to decrypt and scan the files embedded within the compressed archive. Note that, if a password hint is identified instead of a literal password, the intervention of a human user (such as a security researcher or end user who may be able to decipher the password hint) may be necessary.

This is useful in the case that a malware author may realize that antivirus scanners are sophisticated enough to identify "password equals" style passwords embedded within a compressed archive. In that case, the malware author may attempt to get around the malware scanner by providing a password hint that is relatively simple for a human user to decode, but very difficult for a computer to decode. This is similar to a completely automated public Turing test to tell computers and humans apart (CAPTCHA), which is easy for humans to decipher, but difficult for computers to do so. In the case that a password hint is identified in the unencrypted metadata, then the file may be marked as suspicious and provided to a security researcher along with the password hint for additional analysis. If a literal password is provided, then the anti-malware scanner can actually scan the compressed files and identify any malware within.

In block 598, the method is done.

Figure 6:
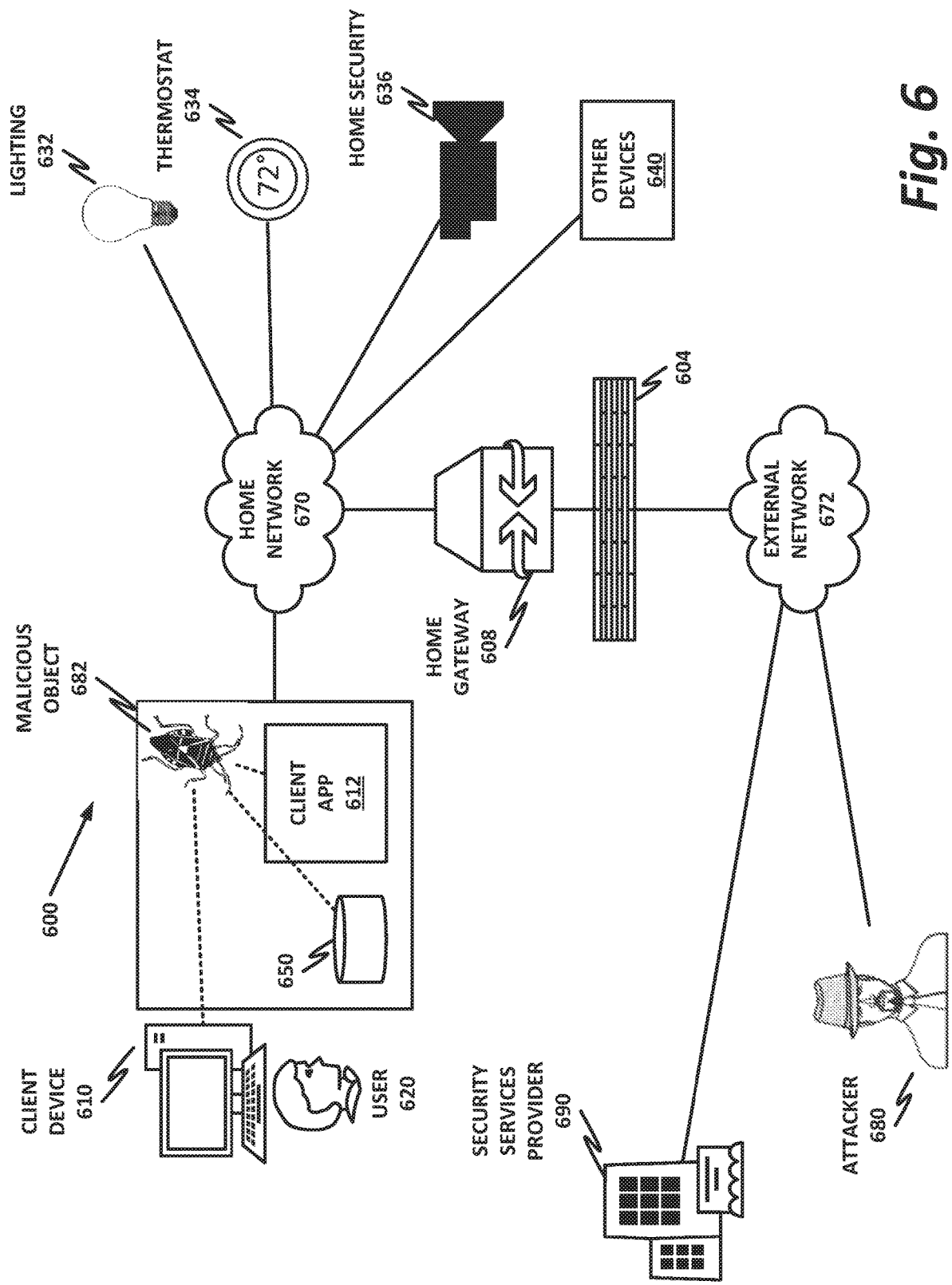
FIG. 6 is a block diagram of a home network.

FIG. 6 is a network-level diagram of a home network. Embodiments of home network 600 may benefit from the scanning of encrypted ZIP files, as disclosed in the present specification. The method disclosed herein may be provided in conjunction with client device 610 or within gateway 608, by way of nonlimiting example. In the example of FIG. 6, home network 600 may be a "smart home" with various Internet of things (IoT) devices that provide home automation or other services.

Home network 600 is provided herein as an illustrative and nonlimiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 600, one or more users 620 operate one or more client devices 610. A single user 620 and single client device 610 are illustrated here for simplicity, but a home or enterprise may have multiple users, each of which may have multiple devices.

Client devices 610 may be communicatively coupled to one another and to other network resources via home network 670. Home network 670 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 670 may also include one or more servers, firewalls, routers, switches, security appliances, antivirus servers, or other network devices, which may be single-purpose appliances, virtual machines, containers, or functions running on client devices 610.

In this illustration, home network 670 is shown as a single network for simplicity, but in some embodiments, home network 670 may include any number of networks, such as one or more intranets connected to the Internet. Home network 670 may also provide access to an external network, such as the Internet, via external network 672. External network 672 may similarly be any suitable type of network.

Home network 670 may connect to the Internet via a home gateway 608, which may be responsible, among other things, for providing a logical boundary between home network 672 and external network 670. Home network 670 may also provide services such as dynamic host configuration protocol (DHCP), gateway services, router services, and switching services, and may act as a security portal across home boundary 604.

Home network 600 may also include a number of discrete IoT devices, which in contemporary practice are increasing regularly. For example, home network 600 may include IoT functionality to control lighting 632, thermostats or other environmental controls 634, a home security system 636, and any number of other devices 640. Other devices 640 may include, as illustrative and nonlimiting examples, network attached storage (NAS), computers, printers, smart televisions, smart refrigerators, smart vacuum cleaners and other appliances, and network connected vehicles.

Home network 600 may communicate across home boundary 604 with external network 672. Home boundary 604 may represent a physical, logical, or other boundary. External network 672 may include, for example, websites, servers, network protocols, and other network-based services. In one example, an attacker 680 (or other similar malicious or negligent actor) also connects to external network 672. A security services provider 690 may provide services to home network 600, such as security software, security updates, network appliances, or similar. For example, MCAFEE, LLC provides a comprehensive suite of security services that may be used to protect home network 600.

In embodiments of the present specification, attacker 680 may attempt to use a compressed ZIP archive with an embedded password in a filename to get around an anti-malware scanner. The method of scanning encrypted ZIP files disclosed herein may be employed to mitigate such attacks and to protect overall system security.

It may be a goal of users 620 and home network 600 to successfully operate client devices 610 and IoT devices without interference from attacker 680 or from unwanted security objects. In one example, attacker 680 is a malware author whose goal or purpose is to cause malicious harm or mischief, for example, by injecting malicious object 682 into client device 610. Once malicious object 682 gains access to client device 610, it may try to perform work such as social engineering of user 620, a hardware-based attack on client device 610, modifying storage 650 (or volatile memory), modifying client application 612 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 680 to leverage against home network 670.

Malicious harm or mischief may take the form of installing root kits or other malware on client devices 610 to tamper with the system, installing spyware or adware to collect personal and commercial data, defacing websites, operating a botnet such as a spam server, or simply to annoy and harass users 620. Thus, one aim of attacker 680 may be to install his malware on one or more client devices 610 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 680 may also want to commit industrial or other espionage, such as stealing classified or proprietary data, stealing identities, or gaining unauthorized access to enterprise resources. Thus, attacker 680's strategy may also include trying to gain physical access to one or more client devices 610 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 680. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 600 may contract with or subscribe to a security services provider 690, which may provide security services, updates, antivirus definitions, patches, products, and services. MCAFEE, LLC is a nonlimiting example of such a security services provider that offers comprehensive security and antivirus solutions. In some cases, security services provider 690 may include a threat intelligence capability such as the global threat intelligence (GTI™) database provided by MCAFEE, LLC. Security services provider 690 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 7:
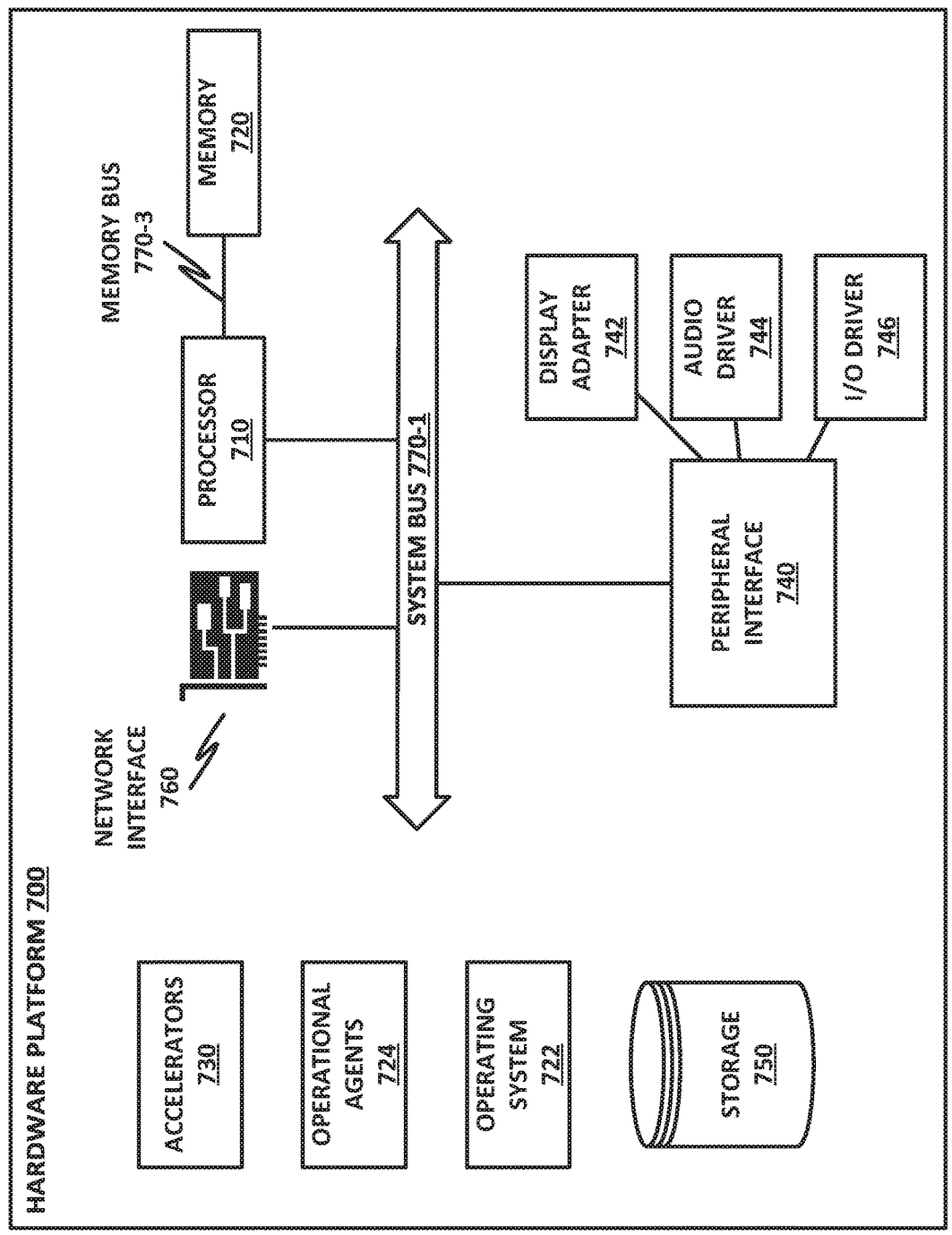
FIG. 7 is a block diagram of a hardware platform.

FIG. 7 is a block diagram of hardware platform 700. Hardware platform 700 may represent any suitable computing device. Furthermore, hardware platform 700 could be specifically a mobile device, a client device, an anti-malware appliance, a gateway, a router, a firewall, a dedicated security device, or any other suitable security device configured to perform anti-malware services.

In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 610, home gateway 608, and the IoT devices illustrated in FIG. 6 may all be examples of devices that run on a hardware platform such as hardware platform 700. FIG. 7 presents a view of many possible elements that may be included in a hardware platform, but it should be understood that not all of these are necessary in every platform, and platforms may also include other elements. For example, peripheral interface 740 may be an essential component in a user-class device to provide input and output, while it may be completely unnecessary in a virtualized server or hardware appliance that communicates strictly via networking protocols.

By way of illustrative example, hardware platform 700 provides a processor 710 connected to a memory 720 and other system resources via one or more buses, such a system bus 770-1 and a memory bus 770-3.

Other components of hardware platform 700 include a storage 750, network interface 760, and peripheral interface 740. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 720 and storage 750, for example, in a single physical memory device, and in other cases, memory 720 and/or storage 750 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 760 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 710 may be treated as only one core of a multi-core processor, or may be treated as the entire multi-core processor, as appropriate. In some embodiments, one or more co-processors may also be provided for specialized or support functions.

Processor 710 may be communicatively coupled to devices via a system bus 770-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 770-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 710 is communicatively coupled to memory 720 via memory bus 770-3, which may be, for example, a direct memory access (DMA) bus, though other memory architectures are possible, including ones in which memory 720 communicates with processor 710 via system bus 770-1 or some other bus. In the same or an alternate embodiment, memory bus 770-3 may include remote direct memory access (RDMA), wherein processor 710 accesses disaggregated memory resources via DMA or DMA-like interfaces.

To simplify this disclosure, memory 720 is disclosed as a single logical block, but in a physical embodiment may include one or more blocks of any suitable volatile or nonvolatile memory technology or technologies, including, for example, double data rate random-access memory (DDR RAM), static random-access memory (SRAM), dynamic random-access memory (DRAM), persistent random-access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 720 may comprise a relatively low-latency volatile main memory, while storage 750 may comprise a relatively higher-latency nonvolatile memory. However, memory 720 and storage 750 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 750 may be any species of memory 720, or may be a separate device. Storage 750 may include one or more non-transitory computer-readable mediums, including, by way of nonlimiting example, a hard drive, solid-state drive, external storage, microcode, hardware instructions, redundant array of independent disks (RAID), NAS, optical storage, tape drive, backup system, cloud storage, or any combination of the foregoing. Storage 750 may be, or may include therein, a database or databases or data stored in other configurations, and may include a stored copy of operational software such as operating system 722 and software portions, if any, of operational agents 724, accelerators 730, or other engines. Many other configurations are also possible, and are intended to be encompassed within the broad scope of this specification.

As necessary, hardware platform 700 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 700 may be configured for virtualization or containerization, in which case it may also provide a hypervisor, virtualization platform, virtual machine manager (VMM), orchestrator, containerization platform, or other infrastructure to provide flexibility in allocating resources.

Network interface 760 may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 724 are one or more computing engines that may include one or more non-transitory computer-readable mediums having stored thereon executable instructions operable to instruct a processor to provide operational functions. An operational agent 724 of the present specification could include an UNZIP archive and an anti-malware scanner. At an appropriate time, such as upon booting hardware platform 700 or upon a command from operating system 722 or a user or security administrator, processor 710 may retrieve a copy of operational agents 724 (or software portions thereof) from storage 750 and load it into memory 720. Processor 710 may then iteratively execute the instructions of operational agents 724 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, a field-programmable gate array (FPGA) programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 740 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 742, audio driver 744, and input/output (I/O) driver 746. Display adapter 742 may be configured to provide a human-readable visual output, such as a command-line interface (CLI) or graphical desktop such as Microsoft Windows, Apple OSX desktop, or a Unix/Linux X Window System-based desktop. Display adapter 742 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 742 may include a hardware graphics card, which may have its own memory and its own graphics processing unit (GPU). Audio driver 744 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 8:
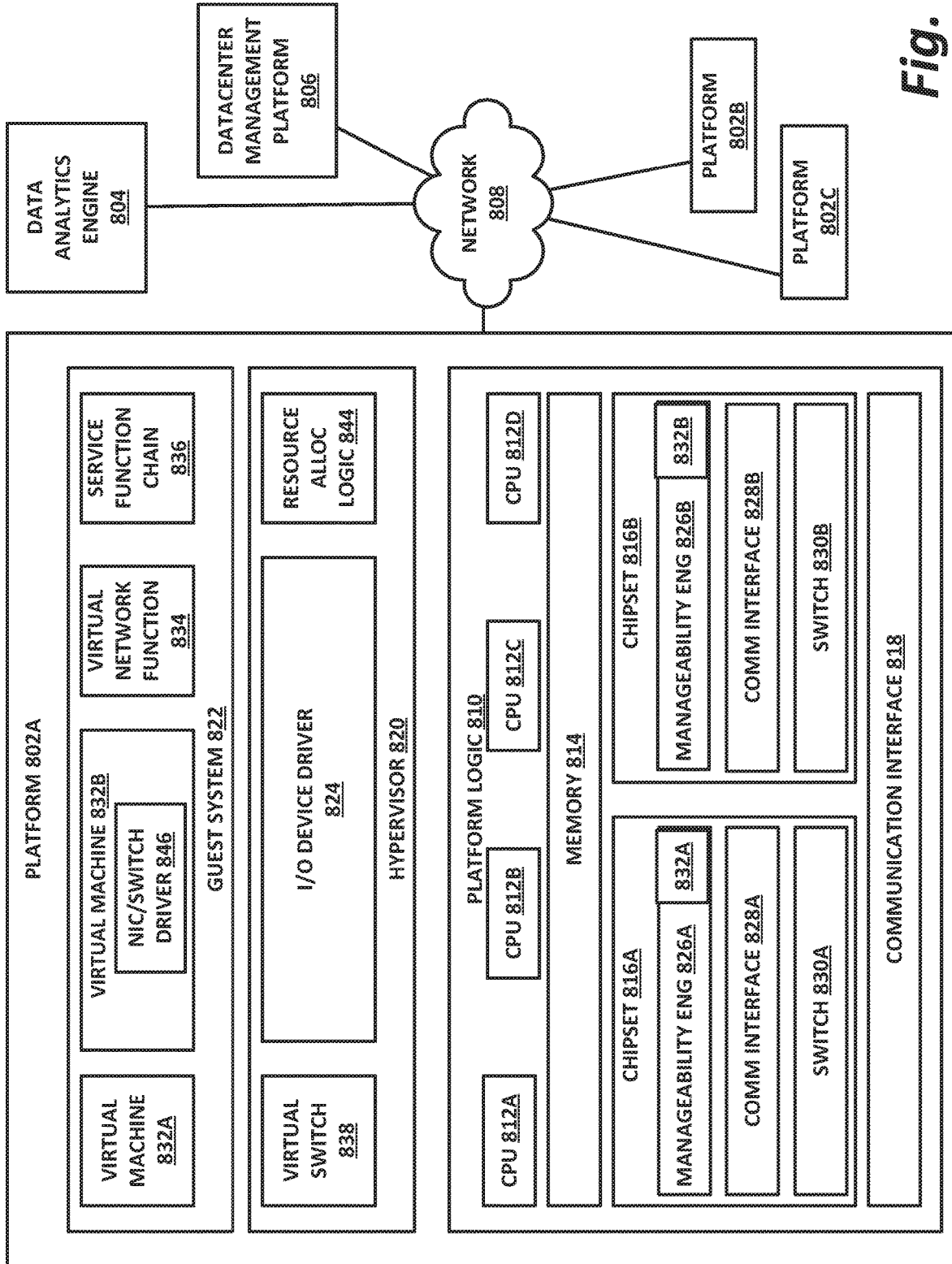
FIG. 8 is a block diagram of components of a computing platform.

FIG. 8 is a block diagram of components of a computing platform 802A. Embodiments of computing platform 802A may be configured or adapted to provide the method of scanning encrypted ZIP files as disclosed in the present specification.

In the embodiment depicted, platforms 802A, 802B, and 802C, along with a data center management platform 806 and data analytics engine 804 are interconnected via network 808. In other embodiments, a computer system may include any suitable number (i.e., one or more) of platforms. In some embodiments (e.g., when a computer system only includes a single platform), all or a portion of the system management platform 806 may be included on a platform 802. A platform 802 may include platform logic 810 with one or more central processing units (CPUs) 812, memories 814 (which may include any number of different modules), chipsets 816, communication interfaces 818, and any other suitable hardware and/or software to execute a hypervisor 820 or other operating system capable of executing workloads associated with applications running on platform 802. In some embodiments, a platform 802 may function as a host platform for one or more guest systems 822 that invoke these applications. Platform 802A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an IoT environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 806, hypervisor 820, or other operating system) of computer platform 802A may assign hardware resources of platform logic 810 to perform workloads in accordance with the stress information. In some embodiments, self-diagnostic capabilities may be combined with the stress monitoring to more accurately determine the health of the hardware resources. Each platform 802 may include platform logic 810. Platform logic 810 comprises, among other logic enabling the functionality of platform 802, one or more CPUs 812, memory 814, one or more chipsets 816, and communication interfaces 828. Although three platforms are illustrated, computer platform 802A may be interconnected with any suitable number of platforms. In various embodiments, a platform 802 may reside on a circuit board that is installed in a chassis, rack, or other suitable structure that comprises multiple platforms coupled together through network 808 (which may comprise, e.g., a rack or backplane switch).

CPUs 812 may each comprise any suitable number of processor cores and supporting logic (e.g., uncores). The cores may be coupled to each other, to memory 814, to at least one chipset 816, and/or to a communication interface 818, through one or more controllers residing on CPU 812 and/or chipset 816. In particular embodiments, a CPU 812 is embodied within a socket that is permanently or removably coupled to platform 802A. Although four CPUs are shown, a platform 802 may include any suitable number of CPUs.

Memory 814 may comprise any form of volatile or nonvolatile memory including, without limitation, magnetic media (e.g., one or more tape drives), optical media, RAM, ROM, flash memory, removable media, or any other suitable local or remote memory component or components. Memory 814 may be used for short, medium, and/or long term storage by platform 802A. Memory 814 may store any suitable data or information utilized by platform logic 810, including software embedded in a computer-readable medium, and/or encoded logic incorporated in hardware or otherwise stored (e.g., firmware). Memory 814 may store data that is used by cores of CPUs 812. In some embodiments, memory 814 may also comprise storage for instructions that may be executed by the cores of CPUs 812 or other processing elements (e.g., logic resident on chipsets 816) to provide functionality associated with the manageability engine 826 or other components of platform logic 810. A platform 802 may also include one or more chipsets 816 comprising any suitable logic to support the operation of the CPUs 812. In various embodiments, chipset 816 may reside on the same die or package as a CPU 812 or on one or more different dies or packages. Each chipset may support any suitable number of CPUs 812. A chipset 816 may also include one or more controllers to couple other components of platform logic 810 (e.g., communication interface 818 or memory 814) to one or more CPUs. In the embodiment depicted, each chipset 816 also includes a manageability engine 826. Manageability engine 826 may include any suitable logic to support the operation of chipset 816. In a particular embodiment, a manageability engine 826 (which may also be referred to as an innovation engine) is capable of collecting real-time telemetry data from the chipset 816, the CPU(s) 812 and/or memory 814 managed by the chipset 816, other components of platform logic 810, and/or various connections between components of platform logic 810. In various embodiments, the telemetry data collected includes the stress information described herein.

In various embodiments, a manageability engine 826 operates as an out-of-band asynchronous compute agent which is capable of interfacing with the various elements of platform logic 810 to collect telemetry data with no or minimal disruption to running processes on CPUs 812. For example, manageability engine 826 may comprise a dedicated processing element (e.g., a processor, controller, or other logic) on chipset 816, which provides the functionality of manageability engine 826 (e.g., by executing software instructions), thus conserving processing cycles of CPUs 812 for operations associated with the workloads performed by the platform logic 810. Moreover, the dedicated logic for the manageability engine 826 may operate asynchronously with respect to the CPUs 812 and may gather at least some of the telemetry data without increasing the load on the CPUs.

A manageability engine 826 may process telemetry data it collects (specific examples of the processing of stress information will be provided herein). In various embodiments, manageability engine 826 reports the data it collects and/or the results of its processing to other elements in the computer system, such as one or more hypervisors 820 or other operating systems and/or system management software (which may run on any suitable logic such as system management platform 806). In particular embodiments, a critical event such as a core that has accumulated an excessive amount of stress may be reported prior to the normal interval for reporting telemetry data (e.g., a notification may be sent immediately upon detection).

Additionally, manageability engine 826 may include programmable code configurable to set which CPU(s) 812 a particular chipset 816 will manage and/or which telemetry data will be collected.

Chipsets 816 also each include a communication interface 828. Communication interface 828 may be used for the communication of signaling and/or data between chipset 816 and one or more I/O devices, one or more networks 808, and/or one or more devices coupled to network 808 (e.g., system management platform 806). For example, communication interface 828 may be used to send and receive network traffic such as data packets. In a particular embodiment, a communication interface 828 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 816 (e.g., manageability engine 826 or switch 830) and another device coupled to network 808. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 828 may allow communication of data (e.g., between the manageability engine 826 and the data center management platform 806) associated with management and monitoring functions performed by manageability engine 826. In various embodiments, manageability engine 826 may utilize elements (e.g., one or more NICs) of communication interfaces 828 to report the telemetry data (e.g., to system management platform 806) in order to reserve usage of NICs of communication interface 818 for operations associated with workloads performed by platform logic 810.

Switches 830 may couple to various ports (e.g., provided by NICs) of communication interface 828 and may switch data between these ports and various components of chipset 816 (e.g., one or more Peripheral Component Interconnect Express (PCIe) lanes coupled to CPUs 812). Switches 830 may be a physical or virtual (i.e., software) switch.

Platform logic 810 may include an additional communication interface 818. Similar to communication interfaces 828, communication interfaces 818 may be used for the communication of signaling and/or data between platform logic 810 and one or more networks 808 and one or more devices coupled to the network 808. For example, communication interface 818 may be used to send and receive network traffic such as data packets. In a particular embodiment, communication interfaces 818 comprise one or more physical NICs. These NICs may enable communication between any suitable element of platform logic 810 (e.g., CPUs 812 or memory 814) and another device coupled to network 808 (e.g., elements of other platforms or remote computing devices coupled to network 808 through one or more networks).

Platform logic 810 may receive and perform any suitable types of workloads. A workload may include any request to utilize one or more resources of platform logic 810, such as one or more cores or associated logic. For example, a workload may comprise a request to instantiate a software component, such as an I/O device driver 824 or guest system 822; a request to process a network packet received from a virtual machine 832 or device external to platform 802A (such as a network node coupled to network 808); a request to execute a process or thread associated with a guest system 822, an application running on platform 802A, a hypervisor 820 or other operating system running on platform 802A; or other suitable processing request.

A virtual machine 832 may emulate a computer system with its own dedicated hardware. A virtual machine 832 may run a guest operating system on top of the hypervisor 820. The components of platform logic 810 (e.g., CPUs 812, memory 814, chipset 816, and communication interface 818) may be virtualized such that it appears to the guest operating system that the virtual machine 832 has its own dedicated components.

A virtual machine 832 may include a virtualized NIC (vNIC), which is used by the virtual machine as its network interface. A vNIC may be assigned a media access control (MAC) address or other identifier, thus allowing multiple virtual machines 832 to be individually addressable in a network.

VNF 834 may comprise a software implementation of a functional building block with defined interfaces and behavior that can be deployed in a virtualized infrastructure. In particular embodiments, a VNF 834 may include one or more virtual machines 832 that collectively provide specific functionalities (e.g., WAN optimization, VPN termination, firewall operations, load-balancing operations, security functions, etc.). A VNF 834 running on platform logic 810 may provide the same functionality as traditional network components implemented through dedicated hardware. For example, a VNF 834 may include components to perform any suitable NFV workloads, such as virtualized evolved packet core (vEPC) components, mobility management entities (MMEs), 3rd Generation Partnership Project (3GPP) control and data plane components, etc.

SFC 836 is a group of VNFs 834 organized as a chain to perform a series of operations, such as network packet processing operations. Service function chaining may provide the ability to define an ordered list of network services (e.g., firewalls and load balancers) that are stitched together in the network to create a service chain.

A hypervisor 820 (also known as a virtual machine monitor) may comprise logic to create and run guest systems 822. The hypervisor 820 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 810. Services of hypervisor 820 may be provided by virtualizing in software or through hardware assisted resources that require minimal software intervention, or both. Multiple instances of a variety of guest operating systems may be managed by the hypervisor 820. Each platform 802 may have a separate instantiation of a hypervisor 820.

Hypervisor 820 may be a native or bare-metal hypervisor that runs directly on platform logic 810 to control the platform logic and manage the guest operating systems. Alternatively, hypervisor 820 may be a hosted hypervisor that runs on a host operating system and abstracts the guest operating systems from the host operating system. Hypervisor 820 may include a virtual switch 838 that may provide virtual switching and/or routing functions to virtual machines of guest systems 822. The virtual switch 838 may comprise a logical switching fabric that couples the vNICs of the virtual machines 832 to each other, thus creating a virtual network through which virtual machines may communicate with each other.

Virtual switch 838 may comprise a software element that is executed using components of platform logic 810. In various embodiments, hypervisor 820 may be in communication with any suitable entity (e.g., a SDN controller) which may cause hypervisor 820 to reconfigure the parameters of virtual switch 838 in response to changing conditions in platform 802 (e.g., the addition or deletion of virtual machines 832 or identification of optimizations that may be made to enhance performance of the platform).

Hypervisor 820 may also include resource allocation logic 844, which may include logic for determining allocation of platform resources based on the telemetry data (which may include stress information). Resource allocation logic 844 may also include logic for communicating with various components of platform logic 810 entities of platform 802A to implement such optimization, such as components of platform logic 810.

Any suitable logic may make one or more of these optimization decisions. For example, system management platform 806; resource allocation logic 844 of hypervisor 820 or other operating system; or other logic of computer platform 802A may be capable of making such decisions. In various embodiments, the system management platform 806 may receive telemetry data from and manage workload placement across multiple platforms 802. The system management platform 806 may communicate with hypervisors 820 (e.g., in an out-of-band manner) or other operating systems of the various platforms 802 to implement workload placements directed by the system management platform.

The elements of platform logic 810 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 802A may be coupled together in any suitable manner such as through one or more networks 808. A network 808 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 9:
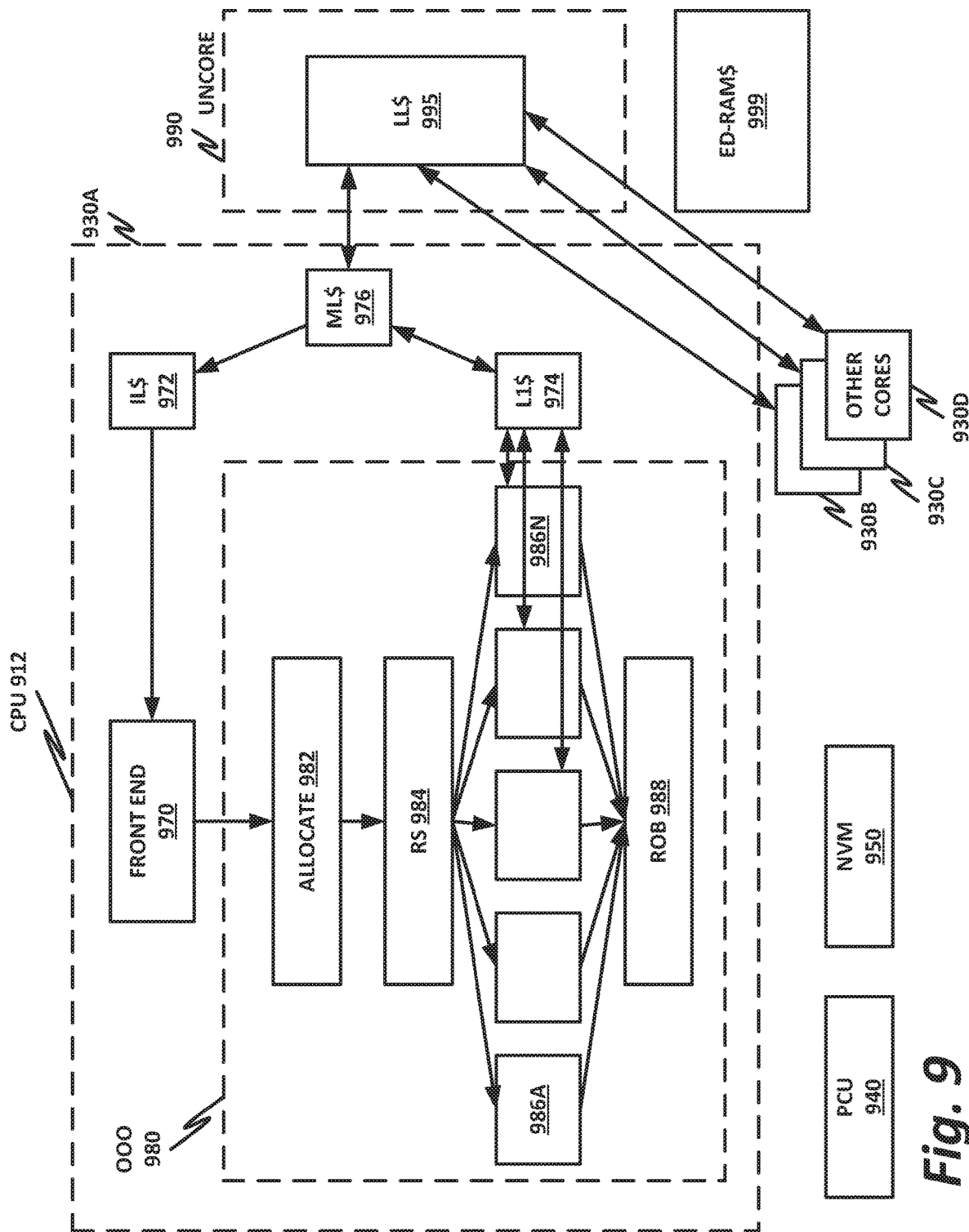
FIG. 9 is a block diagram of a central processing unit (CPU).

FIG. 9 illustrates a block diagram of a central processing unit (CPU) 912. Embodiments of CPU 912 may be configured or adapted to provide the method of scanning encrypted ZIP files as disclosed in the present specification.

Although CPU 912 depicts a particular configuration, the cores and other components of CPU 912 may be arranged in any suitable manner. CPU 912 may comprise any processor or processing device, such as a microprocessor, an embedded processor, a digital signal processor (DSP), a network processor, an application processor, a co-processor, a system-on-a-chip (SoC), or other device to execute code. CPU 912, in the depicted embodiment, includes four processing elements (cores 930 in the depicted embodiment), which may include asymmetric processing elements or symmetric processing elements. However, CPU 912 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources.

A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 930A includes an out-of-order processor that has a front end unit 970 used to fetch incoming instructions, perform various processing (e.g., caching, decoding, branch predicting, etc.) and passing instructions/operations along to an out-of-order (OOO) engine. The OOO engine performs further processing on decoded instructions.

A front end 970 may include a decode module coupled to fetch logic to decode fetched elements. Fetch logic, in one embodiment, includes individual sequencers associated with thread slots of cores 930. Usually, a core 930 is associated with a first ISA, which defines/specifies instructions executable on core 930. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 930, in one embodiment, recognize the same ISA (or a subset thereof). Alternatively, in a heterogeneous core environment, a decoder of one or more cores (e.g., core 930B) may recognize a second ISA (either a subset of the first ISA or a distinct ISA).

In the embodiment depicted, the OOO engine includes an allocate unit 982 to receive decoded instructions, which may be in the form of one or more micro-instructions or uops, from front end unit 970, and allocate them to appropriate resources such as registers and so forth. Next, the instructions are provided to a reservation station 984, which reserves resources and schedules them for execution on one of a plurality of execution units 986A-986N. Various types of execution units may be present, including, for example, arithmetic logic units (ALUs), load and store units, vector processing units (VPUs), and floating point execution units, among others. Results from these different execution units are provided to a reorder buffer (ROB) 988, which take unordered results and return them to correct program order.

In the embodiment depicted, both front end unit 970 and OOO engine 980 are coupled to different levels of a memory hierarchy. Specifically shown is an instruction level cache 972, that in turn couples to a mid-level cache 976, that in turn couples to a last level cache 995. In one embodiment, last level cache 995 is implemented in an on-chip (sometimes referred to as uncore) unit 990. Uncore 990 may communicate with system memory 999, which, in the illustrated embodiment, is implemented via embedded DRAM (eDRAM). The various execution units 986 within OOO engine 980 are in communication with a first level cache 974 that also is in communication with mid-level cache 976. Additional cores 930B-930D may couple to last level cache 995 as well.

In particular embodiments, uncore 990 may be in a voltage domain and/or a frequency domain that is separate from voltage domains and/or frequency domains of the cores. That is, uncore 990 may be powered by a supply voltage that is different from the supply voltages used to power the cores and/or may operate at a frequency that is different from the operating frequencies of the cores.

CPU 912 may also include a power control unit (PCU) 940. In various embodiments, PCU 940 may control the supply voltages and the operating frequencies applied to each of the cores (on a per-core basis) and to the uncore. PCU 940 may also instruct a core or uncore to enter an idle state (where no voltage and clock are supplied) when not performing a workload.

In various embodiments, PCU 940 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 940 may detect stress characteristics at any suitable interval.

In various embodiments, PCU 940 is a component that is discrete from the cores 930. In particular embodiments, PCU 940 runs at a clock frequency that is different from the clock frequencies used by cores 930. In some embodiments where the PCU is a microcontroller, PCU 940 executes instructions according to an ISA that is different from an ISA used by cores 930.

In various embodiments, CPU 912 may also include a nonvolatile memory 950 to store stress information (such as stress characteristics, incremental stress values, accumulated stress values, stress accumulation rates, or other stress information) associated with cores 930 or uncore 990, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including a CPU package. An SoC represents an integrated circuit (IC) that integrates components of a computer or other electronic system into a single chip. Thus, for example, client devices 610 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 710, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 750 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 720 and storage 750, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 710 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor and a memory; and one or more mediums including instructions to instruct the processor to provide a security scanner to: determine that an object to be inspected is an archive comprising a plurality of bundled files; determine that the archive is encrypted; identify unencrypted data within the encrypted archive that can be made visible to an end user after a failed decryption operation; scan the unencrypted data for a pattern that matches password data; and attempt to decrypt the archive according to the password data.

There is further disclosed a computing apparatus, wherein the security scanner is further to determine that the attempt to decrypt was successful, extract the bundled files, and perform a security scan on the bundled files.

There is further disclosed a computing apparatus, wherein the unencrypted data are metadata for the bundled files.

There is further disclosed a computing apparatus, wherein the metadata comprise local headers for compressed files according to a ZIP file compression standard.

There is further disclosed a computing apparatus, wherein the archive comprises a compressed file archive according to a ZIP file compression standard.

There is further disclosed a computing apparatus, wherein the archive comprises a file archive according to a compression or archival format selected from the group consisting of Archiver (.a), cpio (.cpio), Shell Archive (.shar, .run), tape archive (.tar), extended tar, Bagit, 7zip (.7z), ACE (.ace), AFA (.afa), ARC (.arc), ARJ (.arj), B1 (.b1), cabinet (.cab), compact file set (.cfs), compact pro (.cpt), disk archive (.dar), DGCA (.dgc), FreeArc (.arc), LHZ (.lzh, .lha), LZX (.lzx), Sparc (.arc), WinMount (.mou), Macintosh disk image (.dmg), partition image (.partimg), PAQ family (.paq*, .lpaq*), PEA (.pea), PIM (.pim), Quadruple D (.qda), RAR (.rar), RK (.rk), NuFX (.shk), Stuffit (.sit), Stuffit X (.sitx), UltraCompressor II (.uc, .uc0, .uc2, .ucn, .ur2, .ue2), Windows Image (.wim), Zip/PKZIP (.zip), and ZPAQ (.zpaq).

There is further disclosed a computing apparatus, wherein scanning the unencrypted data for a pattern that matches password data comprises applying a regular expression to pattern match a password format.

There is further disclosed a computing apparatus, wherein scanning the unencrypted data for a pattern that matches password data comprises identifying a password hint, and providing the password hint to a human user.

There is further disclosed a computing apparatus, wherein the security scanner is further to determine that the attempt to decrypt was unsuccessful, and flagging the archive as suspicious.

There is further disclosed a computing apparatus, wherein the security scanner is further to request end-user confirmation for the suspicious archive.

There is further disclosed a computing apparatus, wherein the security scanner is further to request enterprise security administrator input for the suspicious archive.

There are also disclosed one or more tangible, non-transitory computer-readable mediums having stored thereon executable instructions to instruct a processor to provide a security scanner to: receive an object for inspection; determine that the object is a compressed or uncompressed archive file comprising a plurality of embedded files; determine that the archive file is password protected; locate unencrypted data within the archive file; scan the unprotected data for a potential password data; and attempt to access the archive file according to the potential password data.

There are further disclosed one or more tangible, non-transitory computer-readable mediums, wherein the security scanner is further to determine that the attempt to access was successful, extract the embedded files, and perform a security scan on the embedded files.

There are further disclosed one or more tangible, non-transitory computer-readable mediums, wherein the unprotected data comprise metadata for the embedded files.

There are further disclosed one or more tangible, non-transitory computer-readable mediums, wherein the metadata comprise local headers for compressed files according to a ZIP file compression standard.

There are further disclosed one or more tangible, non-transitory computer-readable mediums, wherein the archive file is a compressed file according to a ZIP file compression standard.

There are further disclosed one or more tangible, non-transitory computer-readable mediums, wherein the archive file is a compressed or uncompressed archive according to a format selected from the group consisting of Archiver (.a), cpio (.cpio), Shell Archive (.shar, .run), tape archive (.tar), extended tar, Bagit, 7zip (.7z), ACE (.ace), AFA (.afa), ARC (.arc), ARJ (.arj), B1 (.b1), cabinet (.cab), compact file set (.cfs), compact pro (.cpt), disk archive (.dar), DGCA (.dgc), FreeArc (.arc), LHZ (.lzh, .lha), LZX (.lzx), Sparc (.arc), WinMount (.mou), Macintosh disk image (.dmg), partition image (.partimg), PAQ family (.paq*, .lpaq*), PEA (.pea), PIM (.pim), Quadruple D (.qda), RAR (.rar), RK (.rk), NuFX (.shk), Stuffit (.sit), Stuffit X (.sitx), UltraCompressor II (.uc, .uc0, .uc2, .ucn, .ur2, .ue2), Windows Image (.wim), Zip/PKZIP (.zip), and ZPAQ (.zpaq).

There are further disclosed one or more tangible, non-transitory computer-readable mediums, wherein scanning the unprotected data for a potential password comprises applying a regular expression to pattern match a password format.

There are further disclosed one or more tangible, non-transitory computer-readable mediums, wherein scanning the unprotected data for a potential password comprises identifying a password hint, and providing the password hint to a human user.

There are further disclosed one or more tangible, non-transitory computer-readable mediums, wherein the security scanner is further to determine that the attempt to access was unsuccessful, and flag the archive as suspicious.

There are further disclosed one or more tangible, non-transitory computer-readable mediums, wherein the security scanner is further to request end-user confirmation for the suspicious archive.

There are further disclosed one or more tangible, non-transitory computer-readable mediums, wherein the security scanner is further to request enterprise security administrator input for the suspicious archive.

There is also disclosed a method of performing a security scan for a computing device or network, comprising: receiving an object for inspection; determining that the object is a compressed or uncompressed archive file comprising a file bundle; determining that the archive file is encrypted by a password; locating plain-text data within the archive file;

scanning the plain-text data for a password or password hint; and attempting to access the archive file according to the password or password hint.

There is further disclosed a method, further comprising determining that the attempt to access was successful, extract the embedded files, and perform a security scan on the embedded files.

There is further disclosed a method, wherein the plain-text data comprise metadata for the embedded files.

There is further disclosed a method, wherein the metadata comprise local headers for compressed files according to a ZIP file compression standard.

There is further disclosed a method, wherein the archive file is a compressed file according to a ZIP file compression standard.

There is further disclosed a method, wherein the archive file is a compressed or uncompressed archive according to a format selected from the group consisting of Archiver (.a), cpio (.cpio), Shell Archive (.shar, .run), tape archive (.tar), extended tar, Bagit, 7zip (.7z), ACE (.ace), AFA (.afa), ARC (.arc), ARJ (.arj), B1 (.b1), cabinet (.cab), compact file set (.cfs), compact pro (.cpt), disk archive (.dar), DGCA (.dgc), FreeArc (.arc), LHZ (.lzh, .lha), LZX (.lzx), Sparc (.arc), WinMount (.mou), Macintosh disk image (.dmg), partition image (.partimg), PAQ family (.paq*, .lpaq*), PEA (.pea), PIM (.pim), Quadruple D (.qda), RAR (.rar), RK (.rk), NuFX (.shk), Stuffit (.sit), Stuffit X (.sitx), UltraCompressor II (.uc, .uc0, .uc2, .ucn, .ur2, .ue2), Windows Image (.wim), Zip/PKZIP (.zip), and ZPAQ (.zpaq).

There is further disclosed a method, wherein scanning the plain-text data for a potential password comprises applying a regular expression to pattern match a password format.

There is further disclosed a method, wherein scanning the plain-text data for a potential password comprises identifying a password hint, and providing the password hint to a human user.

There is further disclosed a method, further comprising determining that the attempt to access was unsuccessful, and flagging the archive as suspicious.

There is further disclosed a method, further comprising requesting end-user confirmation for the suspicious archive.

There is further disclosed a method, further comprising requesting enterprise security administrator input for the suspicious archive.

What is claimed is:

1. A computing apparatus, comprising:
   a hardware platform comprising a processor and a memory; and
   one or more mediums including instructions to instruct the processor to:
      determine that an object to be inspected is a zip archive comprising a plurality of bundled files;
      determine that the zip archive is encrypted;
      identify unencrypted local headers within the encrypted zip archive;
      use regular expressions to scan the unencrypted local headers for a pattern that provides a password hint;
      infer a decryption password from the password hint; and
      attempt to decrypt the zip archive according to the inferred decryption password.

2. The computing apparatus of claim 1, wherein the instructions are further to determine that the attempt to decrypt was successful, extract the bundled files, and perform a security scan on the bundled files.

3. The computing apparatus of claim 1, wherein the instructions are further to provide the password hint to a human user.

4. The computing apparatus of claim 1, wherein the instructions are further to determine that the attempt to decrypt was unsuccessful, and based on the determination, flag the zip archive as suspicious.

5. The computing apparatus of claim 4, wherein the instructions are further to request end-user confirmation for the suspicious zip archive.

6. The computing apparatus of claim 4, wherein the instructions are further to request enterprise security administrator input for the suspicious zip archive.

7. One or more tangible, non-transitory computer-readable mediums having stored thereon executable instructions to instruct a processor to:
   receive an object for inspection;
   determine that the object is a compressed or uncompressed zip archive file comprising a plurality of embedded files;
   determine that the zip archive file is password protected;
   locate unencrypted local headers within the zip archive file;
   use regular expressions to scan the unencrypted local headers for a potential password hint;
   infer a decryption password from the password hint; and
   attempt to access the zip archive file according to the inferred decryption password.

8. The one or more tangible, non-transitory computer-readable mediums of claim 7, wherein the instructions are further to determine that the attempt to access was successful, extract the embedded files, and perform a security scan on the embedded files.

9. The one or more tangible, non-transitory computer-readable mediums of claim 7, wherein the instructions are further to provide the password hint to a human user.

10. The one or more tangible, non-transitory computer-readable mediums of claim 7, wherein the instructions are further to determine that the attempt to access was unsuccessful, and based on the determination, flag the zip archive as suspicious.

11. The one or more tangible, non-transitory computer-readable mediums of claim 10, wherein the instructions are further to request end-user confirmation for the suspicious zip archive.

12. The one or more tangible, non-transitory computer-readable mediums of claim 10, wherein the instructions are further to request enterprise security administrator input for the suspicious zip archive.

13. A method of performing a security scan for a computing device or network, comprising:
   receiving an object for inspection;
   determining that the object is a compressed or uncompressed zip archive file comprising a file bundle;
   determining that the zip archive file is encrypted by a password;
   locating plain-text local headers within the zip archive file;
   using regular expressions to scan the plain-text local headers for a password or password hint;
   inferring a decryption password from the password hint; and
   attempting to access the zip archive file according to the inferred decryption password.

14. The method of claim 13, further comprising determining that the attempt to access was successful, extracting the plain-text local headers, and performing a security scan on the plain-text local headers.

15. The method of claim 13, further comprising providing the password hint to a human user.

16. The method of claim 13, further comprising determining that the attempt to access was unsuccessful, and based on the determination, flagging the zip archive as suspicious.

17. The method of claim 16, further comprising requesting end-user confirmation for the suspicious zip archive.

18. The method of claim 16, further comprising requesting enterprise security administrator input for the suspicious zip archive.

* * * * *